United States Patent
Morgan et al.

(10) Patent No.: US 6,240,086 B1
(45) Date of Patent: May 29, 2001

(54) DYNAMIC DSP ALLOCATION FOR UNIVERSAL ACCESS TO A PACKET NETWORK

(75) Inventors: Edward Morgan; William Witowsky, both of Gaithersburg; Joseph Crupi, North Potomac, all of MD (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/419,673

(22) Filed: Oct. 15, 1999

(51) Int. Cl.⁷ .................... H04L 12/46; H04L 12/66; H04Q 11/04
(52) U.S. Cl. .................. 370/352; 370/376; 370/401; 370/410; 370/467; 709/249
(58) Field of Search .................. 370/352, 353, 370/354, 357, 360, 376, 384, 389, 401, 410, 463, 465, 466, 467, 911; 709/230, 249, 250

(56) References Cited

U.S. PATENT DOCUMENTS

| | | |
|---|---|---|
| 4,723,238 * | 2/1988 | Isreal et al. .................... 370/60 |
| 5,142,528 | 8/1992 | Kobayashi et al. .................... 370/79 |
| 5,282,199 * | 1/1994 | Herzberg et al. .................... 370/85.14 |
| 5,349,579 * | 9/1994 | Madonna et al. .................... 370/58.2 |
| 5,497,373 | 3/1996 | Hulen et al. .................... 370/79 |
| 5,546,453 | 8/1996 | Herbert .................... 379/242 |
| 5,982,783 * | 11/1999 | Frey et al. .................... 370/467 |
| 6,002,689 * | 12/1999 | Christie et al. .................... 370/401 |
| 6,026,086 * | 2/2000 | Lancelot et al. .................... 370/353 |

\* cited by examiner

*Primary Examiner*—Alpus H. Hsu
(74) *Attorney, Agent, or Firm*—Warren L. Franz; Wade James Brady, III; Frederick J. Telecky, Jr.

(57) ABSTRACT

A telecommunications gateway allows packets to be sent over a TDM system and allows TDM traffic to be sent over a packet switched network. The gateway is a universal port that includes a plurality of Digital Signal Processors (DSPs) that are controlled by software. The controlling software determines what single function the DSP will perform over multiple channels. Each DSP handles multiple channels, however, each DSP is restricted such that all of its multiple channels are permitted to handle the telecommunications traffic according to one signaling protocol.

7 Claims, 2 Drawing Sheets

DYNAMIC DSP ALLOCATION FOR UNIVERSAL ACCESS TO A PACKET NETWORK

BACKGROUND OF THE INVENTION

1. Field of the Invention

The present invention relates generally to digital signal processors used for allocation of resources. More particularly, the present invention is a gateway that controls and allocates a single function for each digital signal processor in a flexible manner to implement a multi-function system for transmitting Time Division Multiplexed (TDM) telecommunications over a packet network.

2. Background Information

As telecommunication technology advances, the demand for cheaper, better, and more telecommunication services increases. In the past, separate telephone and facsimile lines were sufficient for a business. Today, separate telephone and facsimile lines are insufficient even for a residence. In today's society, businesses and residences need separate telephone, facsimile, and data lines just to keep up with technology.

Thus, as the demands for telecommunication services rise, so does the demand for more telecommunications lines. As society continues to become computer savvy, the demand for more telecommunication lines is becoming an increasing problem. In short, present day telecommunication demands are becoming harder to meet.

To meet some of society's needs, businesses and residences are turning to alternative telecommunication services, such as satellite services, instead of the traditional means, i.e., telephone lines. However, even these alternative telecommunication services are insufficient to meet society's needs. Telephone companies are running out of telephone numbers, modems are becoming outdated quicker than ever, and the demand for telecommunication services continues to rise with no end in sight.

One traditional way to improve telephone service has been through the use of Time Division Multiplexed (TDM) telephony networks. TDM is based on allocating a time slot for each channel connected to the system whether the user uses the allocated time slot or not. However, even with the improvements afforded by TDM technology, telephony systems are still expensive and cannot provide sufficient telecommunication services. As a result, there is a need to migrate from the traditional TDM telephony network towards a packet based network for carrying telecommunication information such as voice/fax/data information.

A packet system adds a header to the information payload to form an information packet, and sends the information packets to a desired location. The packets can vary in size or they may be a set size. If there is too much information to fit into one packet, the information is broken up into several packets with each packet having a header thereby allowing assembly into a coherent file later. At a minimum, the header indicates where the packet is being sent and the relative ordering of the packets. Once packets are received at the desired destination, the packets are then recombined in the proper order. Ideally, packet based systems are high density and low power.

The requirement to have high density and low power for the packet based network is complicated by the desire to have a flexible system that performs many different functions on a per channel basis. The goal is to have a system that can provide a wide variety of functions per channel. For instance, it is desirable to have a system that can be used with voice coders, fax modems, and data modems, as well as operating to accommodate different standards or versions.

The system uses a universal port to handle the different types of telecommunication information. In order to deliver the different telecommunication information, the universal port accommodates different functions on a per channel basis. To make such a system, digital signal processors (DSPs) are used for processing the different telecommunication information through multiple channels. One approach is the use of multi-function, multi-channel DSPs where all functions are available at any time on all DSP channels, i.e., all of the software for running the system is present on each DSP.

Referring to FIG. 1, a multi-function, multi-channel DSP system architecture is illustrated. According to this approach a universal port is implemented having all functions available at all times on a given DSP. As illustrated, the microprocessor 100 contains DSP control software 102 that controls which DSP function is running at any particular time, with all of the functions being available at all times on the DSP. In this example, the DSP 104 can run functional software to handle G.729A voice compression/decompression 106, fax traffic 108, G.723.1 voice compression/decompression 110, or modem traffic 112. Similarly, the DSP 114 can run functional software to handle G.723.1 voice compression/decompression 116, modem traffic 118, G.729A voice compression/decompression 120, or fax traffic 122.

In operation, information to and from physical devices, such as a modem 126, a telephone 128, and fax machine 130, pass through a TDM input 124 and the individual DSPs (104, 114) for processing. The TDM input 124 assigns times slots for each physical device. In this case, each physical device is assigned a time slot regardless of whether that physical device is in use or not.

The DSP control software 102 in microprocessor 100 determines which function each of the channels in each DSP will operate to process. For example, the DSP 104 can be running voice compression/decompression according to G.729A on channel 1, fax relaying on channels 2 and 3, and a V.90 modem on channel 4. The processed information is passed to and from an Internet Protocol (IP) network 132. The IP network 132 may be a WAN or LAN type of IP network.

An advantage of this approach is that any channel within a DSP can be executing any of the configured algorithms. The disadvantage of this approach in DSP utilization is that it is expensive to have all of the algorithms available for use at all times on a large array of individual DSPs. This approach is also an inefficient use of both memory and power. The increased cost in terms of money, space, and power is a function of the product of the number of channels and the number of functions supported.

Therefore there is a need for a gateway that interfaces between traditional telephone equipment and a packet network, which processes and translates telephone network information to packets, and which does so in an efficient manner.

SUMMARY OF THE INVENTION

It is an object of the present invention to provide a gateway that allows telecommunication information from a TDM system to be transmitted over a packet network.

It is still a further object of the present invention to use a universal port to allow various forms of telecommunications to be sent over a packet network.

It is still a further object of the present invention to use single-function, multi-channel DSP system that includes a plurality of DSPs with each DSP running a single function on all of the channels in the particular DSP thereby, transmitting telecommunications information over a packet network.

The present invention is a gateway that allows packets to be sent over a TDM system. The gateway is a universal port that includes a plurality of DSPs that are controlled by software. The controlling software determines what single function the DSP will perform over multiple channels.

Some of the above objects are achieved by a telecommunications gateway for interfacing telecommunications traffic between a TDM network and a packet switched network. The telecommunications gateway includes a time slot interchanger, plural DSPs and a microprocessor controller. The time slot interchanger is connected to handle traffic from the TDM network. The plural DSPs are connected to handle TDM traffic routed according to allocation of time slots by the time slot interchanger. The plural DSPs convert TDM traffic into packets for transport via the packet switched network and converting packet traffic from the packet switched network for transport via the TDM network. The microprocessor operates according to software instructions to control time slot allocation by the time slot interchanger and to control operation of the DSPs. The microprocessor downloads a respective software module to each of the plural DSPs to enable the DSPs to each handle telecommunications traffic according to a respective type of signaling protocol. All channels of each of the plural DSPs handle only telecommunications traffic corresponding to a single one of plural types of signaling protocols.

Other of the above objects are achieved by a telecommunications gateway that is adapted to interface telecommunications traffic between a TDM network and a packet switched network. The telecommunications gateway includes a processor, plural DSPs, and a memory for storing software instructions. The plural DSPs are connected between the TDM network and the packet switched network, convert TDM traffic into packets, and convert packet traffic for transport via the TDM network. The software instructions stored in the memory are adapted to enable the processor to perform operations of allocating TDM traffic and downloading software. TDM traffic is allocated to and from each of the plural DSPs by assigning time slots. Respective software modules are downloaded to each of the plural DSPs to enable the DSPs to each handle telecommunications traffic according to a respective type of signaling protocol. All channels of each of the plural DSPs handle only telecommunications traffic corresponding to a single one of plural types of signaling protocols.

Some of the above objects are also achieved by a method of interfacing telecommunications traffic between a time division multiplexed (TDM) network a packet switched network. Actions according to the method correspond to the software driven operations discussed above.

BRIEF DESCRIPTION OF THE DRAWINGS

The invention will be appreciated by review of the following detailed description, in conjunction with viewing of the appended drawing figures.

DETAILED DESCRIPTION OF THE INVENTION

The present invention is a gateway that allows packets to be sent over a TDM system. The gateway is a universal port that includes a plurality of DSPs that are controlled by software. The controlling software determines what single function the DSP will perform over multiple channels.

The DSPs for implementing a universal port gateway according to the present invention may be obtained commercially, for example, from Texas Instruments, Inc. (model nos. 5420 and 549).

Figure 2:
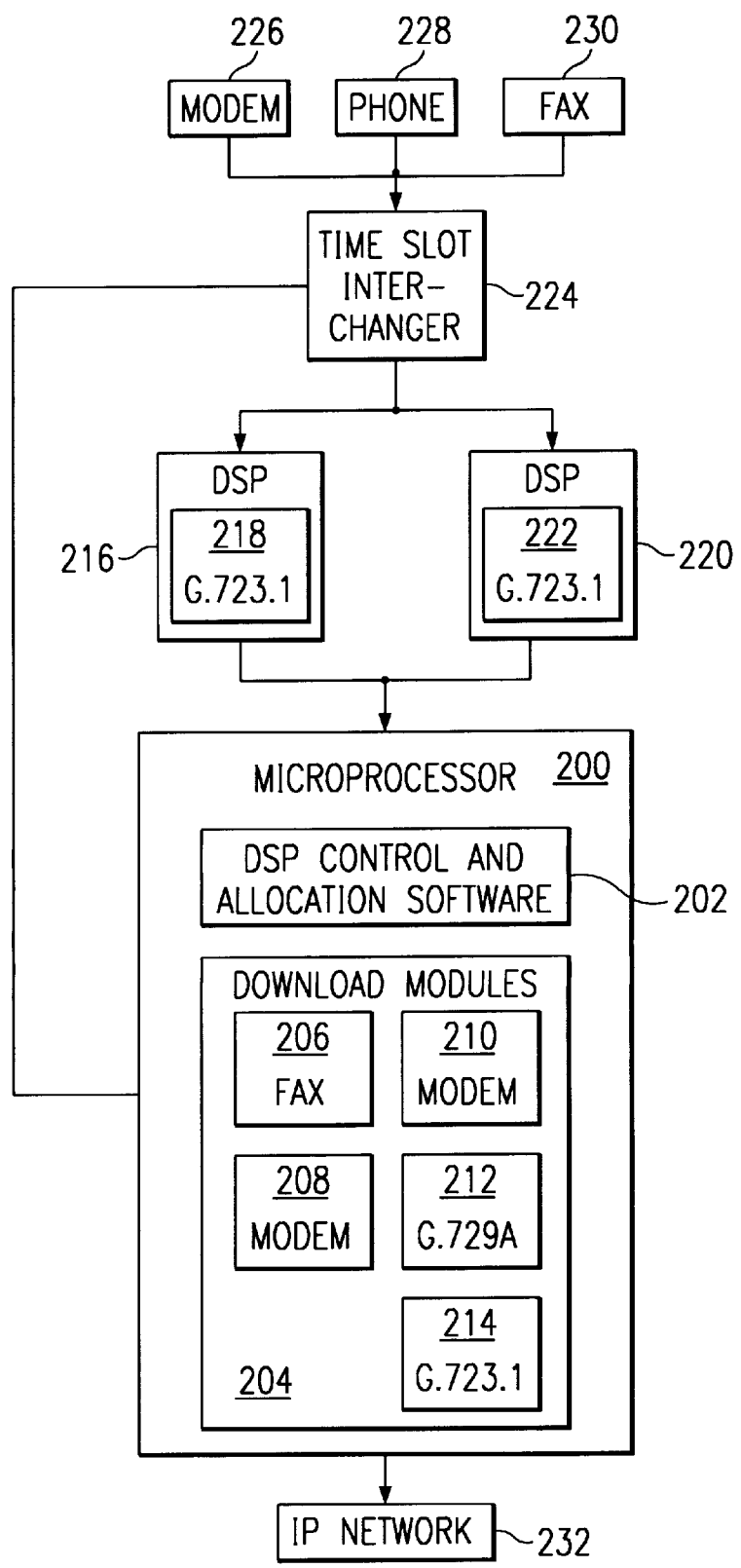
FIG. 2 illustrates a single-function, multi-channel DSP system architecture according to an embodiment of the present invention.

Referring to FIG. 2, a single-function, multi-channel DSP system architecture according to an embodiment of the present invention is illustrated. The single-function, multi-channel system allows only a single function to be run on all channels in a DSP, thereby reducing the resource requirements per DSP. A microprocessor 200 includes DSP control and allocation software 202 (hereinafter referred to as "control software") and download modules 204. Download modules 204 include a fax module 206, modem modules 208, 210, a G.729A voice compression/decompression module 212, and a G.723.1 voice compression/decompression module 214. In this embodiment, the download modules 204 include two modem modules 208 and 210, each of the modem modules for handling different protocols. Generally speaking, the download modules 204 can include software modules to handle any telecommunication protocols known in the art or that is developed in the future.

As illustrated, a first DSP 216 is running a G.723.1 voice compression/decompression module 216 that it has downloaded. The first DSP 216 is running one function only (i.e., compression/decompression of voice signals) on all of the channels in the first DSP 216. If the first DSP 216 has four channels, then all four channels are handling voice compression/decompression. Similarly, a second DSP 220 is running a fax module 222 that it has downloaded. The second DSP 220 is running one function only (i.e., fax traffic handling) on all of the channels in the second DSP 220. However many channels the second DSP 220 contains, all of those channels are operating to handle fax communications.

Control software 202 controls which functions are run on which DSPs. Control software 202 also controls the time slots for transmitting the telecommunication information. Using single-function, multi-channel DSPs allows the system to create a pool of specialized resources.

A call coming into the universal port would start off as a voice call. That is, control software 202 would route the call to a DSP that is running voice processing software. If the mode of the phone call were to change at any time, control software 202 would switch the call to another DSP that has the appropriate software loaded to process that function. This switching operation is accomplished by one of two methods. One method of switching requires control software 202 to re-route time slots to a particular DSP. The other method is to broadcast all timeslots to all DSPs. Control software 202 then controls the DSP timeslot selection based on the function needed.

Figure 1:
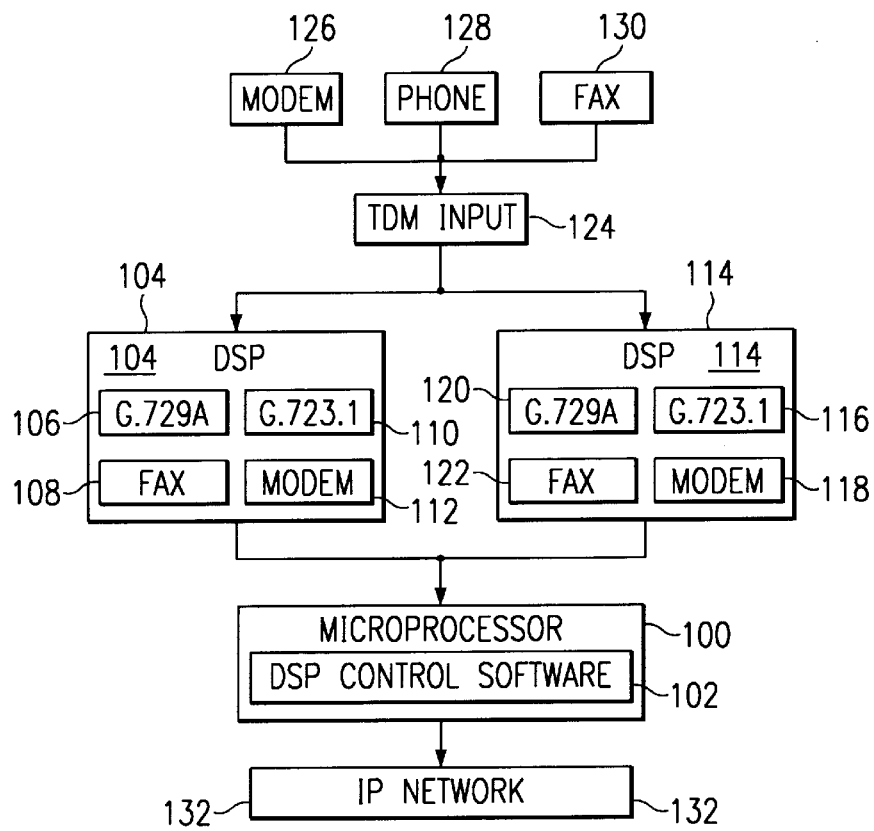
FIG. 1 illustrates a multi-function, multi-channel DSP system architecture.

In operation, information flowing to and from physical devices, such as a modem 226, a telephone 228, and a fax machine 230, pass through a time slot interchanger 224 to the individual DSPs (216 and 220) for processing. The time slot interchanger 224 determines the time slots for each individual physical device. The time slot interchanger 224 can operate in a similar manner as TDM input 124 in FIG. 1 by assigning each physical device a time slot regardless of whether the physical device is in use or not. Alternatively, as in the preferred method discussed above, the time slot interchanger 224 assigns time slots based on need. The time slot interchanger 224 control interface is connected to a microprocessor 200.

The DSP control software 202 determines the time slots for the physical devices and determines which function each of the DSPs will operate to process with every channel in each DSP running the same downloaded module. As illustrated, a first DSP 216 is running a module 212 to handle G.729A voice compression/decompression on all of the channels in that DSP 216. Similarly, a second DSP 220 is running a module 222 to handle fax traffic on all of the channels of that DSP 206. The processed information is sent to and received from, in packets, an Internet Protocol (IP) network 232 (i.e., a WAN or LAN type of IP network).

An advantage of this type of system is that as the number of channels becomes larger, the tradeoff of restricting processing to be functionally organized becomes viable because the probability of using all the available processing power increases with the call volume.

Figure 3:
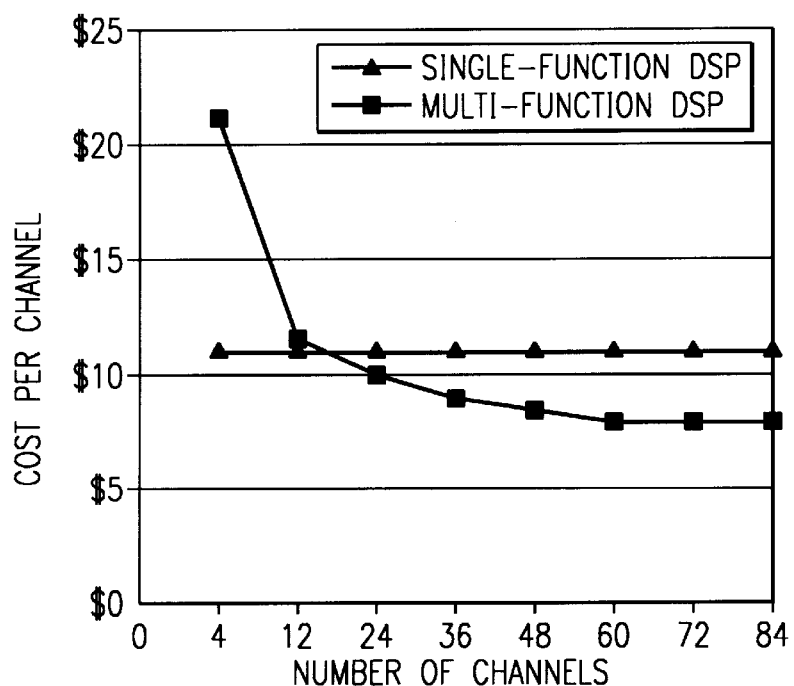
FIG. 3 illustrates a cost analysis comparing a multi-function, multi-channel DSP system architecture with a single-function, multi-channel DSP system architecture.

Referring to FIG. 3, a cost analysis chart for the two different approaches is illustrated. The chart illustrates the cost curve 302 for a multi-function DSP as compared to the cost curve 304 for a single-function DSP. The analysis represented by this chart assumes that there are only three functions of which only one fits into a given DSP's internal memory, and that the DSPs are only capable of 4 channels of processing. The chart illustrates the cost per channel as a function of the number of channels. At a lower channel count (roughly, less than 15 channels), the cost for a single-function, multi-channel DSP is more expensive than the multi-function, multi-channel DSP. However, as the number of channels increases (above about 15 channels) the single-function, multi-channel DSP becomes more cost effective. Thus, when a large number of channels are being used, the single-function, multi-channel DSP is a superior choice.

The present invention has been described for a gateway for allowing telecommunication information from a TDM system to be transmitted over a packet based network over a telephone line, and for receiving packet data from the packet based network to be transported by the TDM system.

Although the present invention has been described in terms of preferred embodiments, it will be appreciated by those of skill in the art that numerous modifications and variations may be made to the invention as described without departing from the scope of the invention. The scope of the present invention is limited only by the appended claims.

What is claimed is:

1. A telecommunications gateway for interfacing telecommunications traffic, the traffic comprising a plurality of signaling protocols, between a time division multiplexed (TDM) network and a packet switched network, the telecommunications gateway comprising:

a time slot interchanger connected to the TDM network for handling traffic from the TDM network;

a plurality of digital signal processors (DSP) connected to the time slot interchanger for handling TDM traffic routed according to allocation of time slots by the time slot interchanger and for converting TDM traffic into packets for transport via the packet switched network and converting packet traffic from the packet switched network for transport via the TDM network; and a microprocessor operating according to software instructions to control time slot allocation by the time slot interchanger and to control operation of the DSPs;

wherein the microprocessor downloads a respective software module to each of the plurality of DSPs to enable the DSPs to each handle telecommunications traffic according to one of the plurality of different signaling protocols, all channels of each of the plurality of DSPs handling only telecommunications traffic corresponding to a single one of the plurality of different signaling protocols and;

wherein the allocation of software to said DSP is determined based upon the need for DSP channels capable of translating said incoming signaling protocol; and wherein said time slot allocations are controlled on the basis of matching signaling protocol to the DSP allocated to translate said signaling protocol.

2. A telecommunications gateway adapted to interface telecommunications traffic, the traffic comprising a plurality of different signaling protocols, between a time division multiplexed (TDM) network and a packet switched network, the telecommunications gateway comprising:

a processor, a plurality of digital signal processors (DSPs), connected between the TDM network and the packet switched network, for converting TDM traffic into packets and for converting packet traffic for transport via the TDM network; and a memory including software instructions adapted to enable the processor to perform operations comprising:

allocating TDM traffic to and from each of the plurality of DSPs by assigning time slots; and downloading a respective software module to each of the plurality of DSPs to enable the DSPs to each handle telecommunications traffic according to one of the plurality of different signaling protocols;

wherein the allocation of software to said DSP is determined based upon the need for DSP channels capable of translating said incoming signaling protocol;

wherein said time slot allocations are controlled on the basis of matching signaling protocol to the DSP allocated to translate said signaling protocol; and wherein all channels of each of the plurality of DSPs handles only telecommunications traffic corresponding to a single one of the plurality of different signaling protocols.

3. A telecommunications gateway adapted to interface telecommunications traffic, the traffic comprising a plurality of different signaling protocols, between a time division multiplexed (TDM) network and a packet switched network, the telecommunications gateway comprising:

a processor, a plurality of digital signal processors (DSPs), connected between the TDM network and the packet switched network for converting TDM traffic into packets and for converting packet traffic for transport via the TDM network; and a memory including software instructions adapted to enable the processor to perform operations comprising:

allocating TDM traffic to and from each of the plurality of DSPs by assigning time slots;

downloading a respective software module to each of the plurality of DSPs to enable the DSPs to each handle telecommunications traffic according to one of the plurality of different signaling protocols; and reallocating a call to have a time slot selection that routes said call to a different one of the plurality of DSPs in the event that a change in signaling protocol occurs during the call;

wherein all channels of each of the plurality of DSPs handles only telecommunications traffic corresponding to a single one of the plurality of different signaling protocols.

4. A telecommunications gateway adapted to interface telecommunications traffic, the traffic comprising a plurality of different signaling protocols, between a time division multiplexed (TDM) network and a packet switched network, the telecommunications gateway comprising:

a processor, a plurality of digital signal processors (DSPs), connected between the TDM network and the packet switched network, for converting TDM traffic into packets and for converting packet traffic for transport via the TDM network; and a memory including software instructions adapted to enable the processor to perform operations comprising:

allocating TDM traffic to and from each of the plurality of DSPs by assigning time slots;

downloading a respective software module to each of the plurality of DSPs to enable the DSPs to each handle telecommunications traffic according to one of the plurality of different signaling protocols; and reallocating a call to a different one of the plurality of DSPs by re-routing the time slot assigned to that call;

wherein all channels of each of the plurality of DSPs handles only telecommunications traffic corresponding to a single one of the plurality of different signaling protocols.

5. A method of interfacing telecommunications traffic, the traffic comprising a plurality of different signaling protocols, between a time division multiplexed (TDM) network and a packet switched network, the method comprising:

allocating TDM traffic to and from each of a plurality of digital signal processors (DSPs) by assigning time slots; and downloading a respective software module to each of the plurality of DSPs to enable the DSPs to each handle the telecommunications traffic according to one of the plurality of different signaling protocols;

wherein the allocation of software to said DSP is determined based upon the need for DSP channels capable of translating said incoming signaling protocol; and wherein said time slot allocations are controlled on the basis of matching signaling protocol to the DSP allocated to translate said signaling protocol; and wherein all channels of each of the plurality of DSPs handles only telecommunications traffic corresponding to a single one of the plurality of different signaling protocols.

6. A method of interfacing telecommunications traffic, the traffic comprising a plurality of different signaling protocols, between a time division multiplexed (TDM) network and a packet switched network, the method comprising:

allocating TDM traffic to and from each of a plurality of digital signal processors (DSPs) by assigning time slots; and downloading a respective software module to each of the plurality of DSPs to enable the DSPs to each handle the telecommunications traffic according to one of the plurality of different signaling protocols;

reallocating a call to have a time slot selection which routes said call to a different one of the plurality of DSPs in the event that a change in signaling protocol occurs during the call;

wherein all channels of each of the plurality of DSPs handles only telecommunications traffic corresponding to a single one of the plurality of different signaling protocols.

7. A method of interfacing telecommunications traffic, the traffic comprising a plurality of different signaling protocols, between a time division multiplexed (TDM) network and a packet switched network, the method comprising:

allocating TDM traffic to and from each of a plurality of digital signal processors (DSPs) by assigning time slots; and downloading a respective software module to each of the plurality of DSPs to enable the DSPs to each handle the telecommunications traffic according to one of the plurality of different signaling protocols;

reallocating a call to a different one of the plurality of DSPs by rerouting the time slot assigned to said call;

wherein all channels of each of the plurality of DSPs handles only telecommunications traffic corresponding to a single one of the plurality of different signaling protocols.

* * * * *